United States Patent
Ehrenleitner et al.

(10) Patent No.: US 6,706,117 B2
(45) Date of Patent: Mar. 16, 2004

(54) INSTALLATION FOR TREATING, IN PARTICULAR FOR COATING, ARTICLES, ESPECIALLY VEHICLE BODIES

(75) Inventors: Franz Ehrenleitner, Stuttgart (DE); Hans-Joachim Weinand, Ditzingen (DE)

(73) Assignee: Eisenmann Maschinenbau KG (DE)

( * ) Notice: Subject to any disclaimer, the term of this patent is extended or adjusted under 35 U.S.C. 154(b) by 0 days.

(21) Appl. No.: 10/204,486

(22) PCT Filed: Nov. 26, 2001

(86) PCT No.: PCT/EP01/13715

§ 371 (c)(1),
(2), (4) Date: Aug. 20, 2002

(87) PCT Pub. No.: WO02/49943

PCT Pub. Date: Jun. 27, 2002

(65) Prior Publication Data

US 2003/0097982 A1 May 29, 2003

(30) Foreign Application Priority Data

Dec. 20, 2000 (DE) .......................................... 100 63 448

(51) Int. Cl.$^7$ ............................................... B05C 19/02
(52) U.S. Cl. ..................................... 118/423; 118/426
(58) Field of Search ................... 104/94, 243; 105/155; 198/346.3, 375, 377.02; 134/116; 118/416, 423, 425, 426, 500; 204/198, 199, 479, 625

(56) References Cited

U.S. PATENT DOCUMENTS 5,725,669 A  3/1998  Heckmann .................. 118/423

FOREIGN PATENT DOCUMENTS

| DE | 44 10 477 C1 | 9/1995 |
|---|---|---|
| DE | 44 27 191 C2 | 6/1996 |
| DE | 196 41 048 A1 | 4/1998 |
| DE | 197 06 175 A1 | 8/1998 |
| DE | 197 44 446 A1 | 4/1999 |
| DE | 199 34 746 A1 | 2/2000 |
| GB | 2 236 734 A | 4/1994 |
| JP | 9-155264 | 6/1997 |

*Primary Examiner*—Brenda A. Lamb
(74) *Attorney, Agent, or Firm*—Factor & Partners

(57) ABSTRACT

An installation for treating, in particular coating, articles, especially vehicle bodies, comprises at least one bath, in which a treatment liquid, in particular a paint, is located. The articles are intended to be immersed therein. A conveyor with which the articles are conveyed through the installation in a continuous or intermittent translational movement comprises a plurality of transport carriages, which run in guided manner on running surfaces. Each transport carriage comprises a separate drive for translational movement and a drive operating independently thereof for the immersion movement. The installation thus constructed is extraordinarily flexible, since the immersion movement does not have to correlate with the translational movement. The transport carriages, optionally carrying different articles, may miss from different directions at different speeds, travel at different speeds and thereby enlarge or reduce distances from preceding transport carriages and, if required, be individually removed from the transport line.

5 Claims, 7 Drawing Sheets

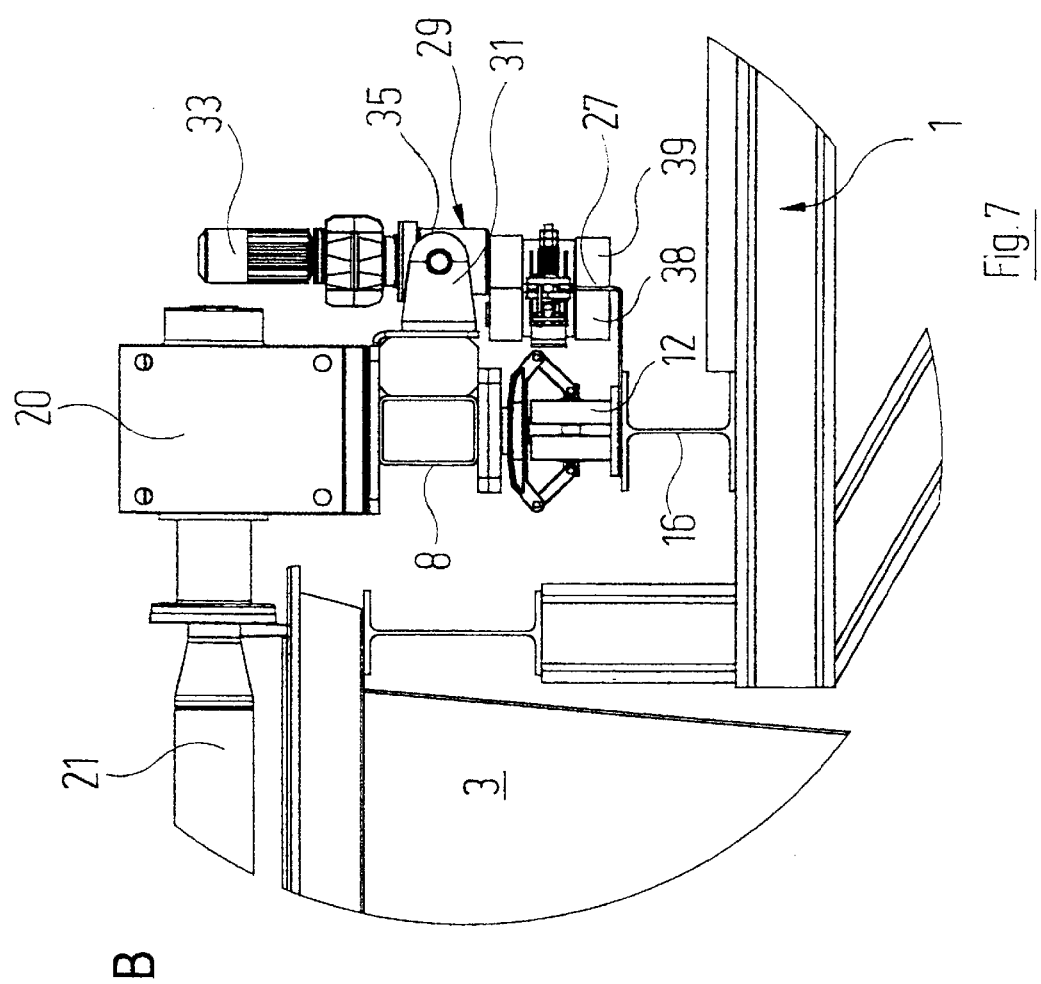

Figure 1:
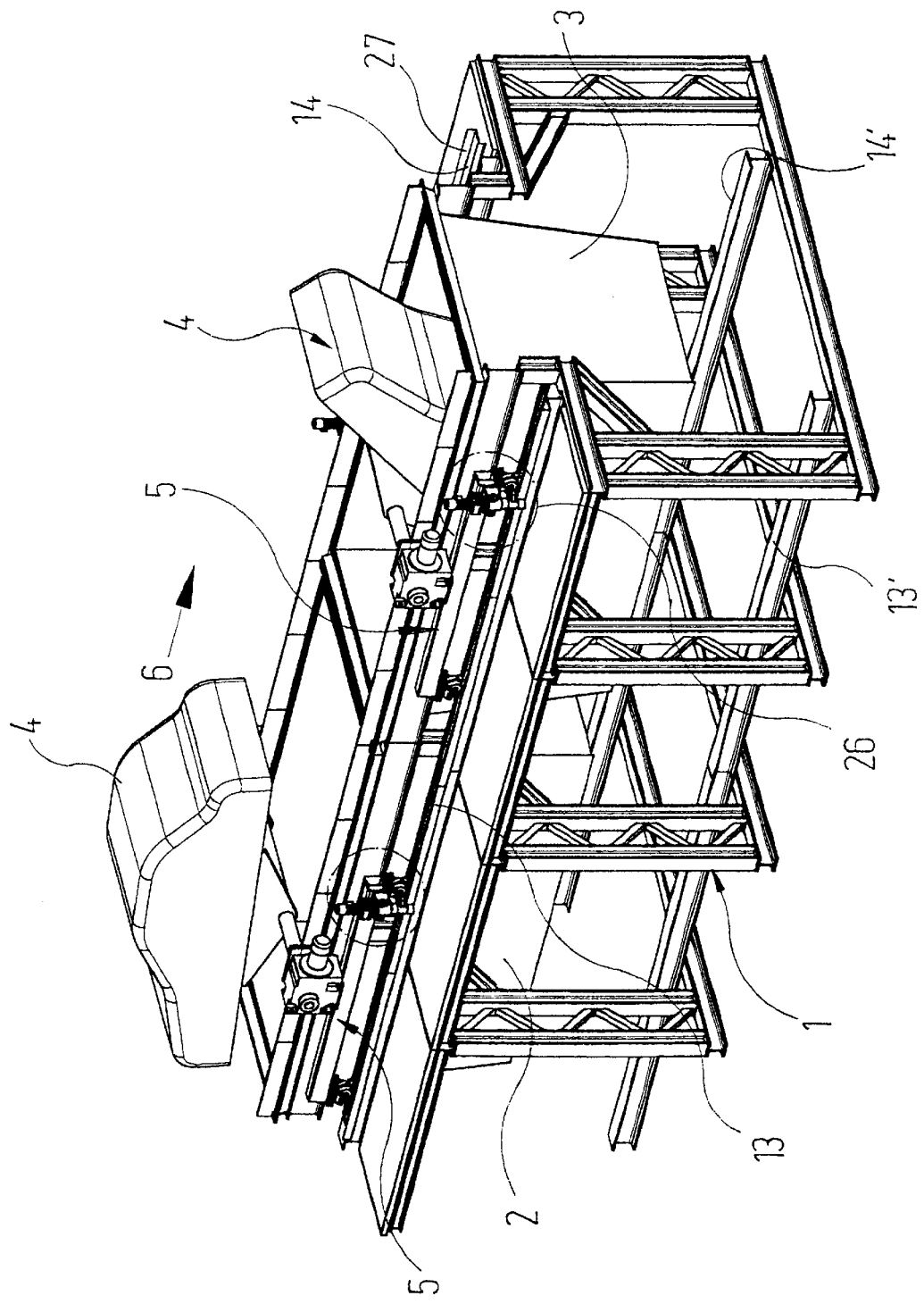

INSTALLATION FOR TREATING, IN PARTICULAR FOR COATING, ARTICLES, ESPECIALLY VEHICLE BODIES

The invention relates to an installation for treating, in particular coating, articles, especially vehicle bodies, having
a) at least one bath, in which a treatment liquid, in particular a paint, is located, in which the articles are intended to be immersed;
b) a conveying means, with which the articles may be conveyed through the installation in a continuous or intermittent translational movement;
c) a plurality of immersion means, which are connected with the conveying means, each carry one article and are in a position to immerse this article in the bath.

An installation of this type is described in DE 196 41 048 C2. The conveying means therein consists of guide rails, in which there run drive means, not described in any more detail; examples of these drive means are chains, hauling ropes, geared rods or the like. A plurality of mounting frameworks for the bodies to be coated are connected with the drive means at regular intervals and are displaced translationally thereby. The translational movements of all the bodies to be coated are in this way compulsorily coupled together. The bodies are immersed in and extracted from the treatment fluid by rotary motion of the mounting frameworks about an axis, which extends horizontally and perpendicularly to the direction of the translational movement. The forces which rotate the mounting frameworks are derived from the translational movement by a kind of cam/crank means, such that the instantaneous angle of rotation of the mounting frameworks always clearly results from the position of the mounting framework in the direction of translation.

A disadvantage of this known installation is its lack of flexibility: as already mentioned, all the articles to be coated can only move jointly in the transport direction. Thus, all the articles in the installation have to pass through the baths in the same way, with the same kinematics and at the same speed. This frequently does not fulfil the requirements of a modern installation, in which successive articles need to be treated in different ways.

The object of the present invention is so to design an installation of the above-mentioned type that it allows altogether more flexible treatment of the individual articles.

This object is achieved according to the invention in that
d) the conveying means comprises a plurality of independent transport carriages, which run in guided manner on running surfaces and each comprise a separate drive for translational movement and a drive operating independently thereof for the immersion movement.

According to the invention, therefore, the rigid coupling present in the prior art between the various mounting frameworks is abandoned and replaced by a plurality of individual transport carriages, which may basically move independently of one another. Each of these transport carriages has its own drive for translational movement. The speeds of the individual transport carriages may thus be independently selected; the intervals between successive transport carriages may be enlarged or reduced. It is additionally possible to guide the immersion movement of the articles independently of the translation movement, since a separate drive is provided for this immersion movement. Thus, for instance a bath may be missed out, simply by not actuating the drive of the carriage for the immersion movement at the appropriate point in the transport path. It is also possible firstly to miss out a bath and then to perform the article immersion process in a backwards movement. This immersion direction may be more favourable than an immersion movement in the forwards direction in particular in the case of bodies which have doors which come open or the like. Moreover, each article to be coated may be individually subjected to a swinging movement within the bath. Articles comprising cavities, like vehicle bodies, may be completely emptied above the respective bath by suitable movements, such that as little as possible of the paint is entrained out of the bath. The speed of the translational movement may be reduced above and in the baths, so resulting in long residence times therein, while the speed of translation between the baths may be increased. Loading and delivery of the articles to be treated may, on the other hand, be performed at a standstill. Altogether, the shortest possible bath lengths may be achieved in this way, such that the space requirement of the overall system is reduced.

In the case of a fault, individual transport carriages may easily be removed from the installation. The risk of bath contamination is reduced in that all conveying system components may be arranged laterally of the baths.

An advantageous further development of the installation according to the invention is distinguished in that at least one vertically oriented transport flange extends parallel to a running surface and in that the drive for the translational movement of each transport carriage comprises a pressure roll drive, which comprises at least two pressure rolls running under pressure on opposing side faces of the transport flange, at least one of which pressure rolls is driven. Drive of the transport carriages for the translational movement thus proceeds not via the running wheels themselves but rather via the above-mentioned, separate pressure roll drive, which interacts with the stationary transport flange. This simplifies control of the transport carriages on their path through the installation. Moreover, good acceleration and deceleration may be achieved with such a drive.

The running wheels of the transport carriages may be rotated about a vertical axis by means of a pivoted bolster. In this embodiment of the invention, the running wheels are thus steerable, which reduces wear and precision requirements for instance in comparison with normal rail running wheels. In particular, by appropriately rotating the pivoted bolsters of the running wheels about the perpendicular axis, the transport carriages may also be moved sideways out of the conveying line, perpendicularly to their longitudinal extension.

At least two wheels of each transport carriage are preferably provided with a leading guide member, which encompasses a profile of the associated running surface and is connected with the pivoted bolster. The transport carriages are conveyed through the installation by these guide members, wherein cornering is straightforwardly possible. The other two wheels of the transport carriages do not need to be guided; they may take the form of simple follower wheels.

The precise configuration of the mounting and guidance of the running wheels and the design of the running wheels themselves may be based on the constructions described in DE 44 27 191 C2, DE 197 44 446 A1 and also DE 199 34 746 A1.

The immersion means may be a rotary means, which immerses the articles in the treatment liquid by rotation about an approximately horizontal axis. The present invention may thus also be used in the case of immersion kinematics as put into practice in the above-described DE 196 41 048 C2.

Figure 2:
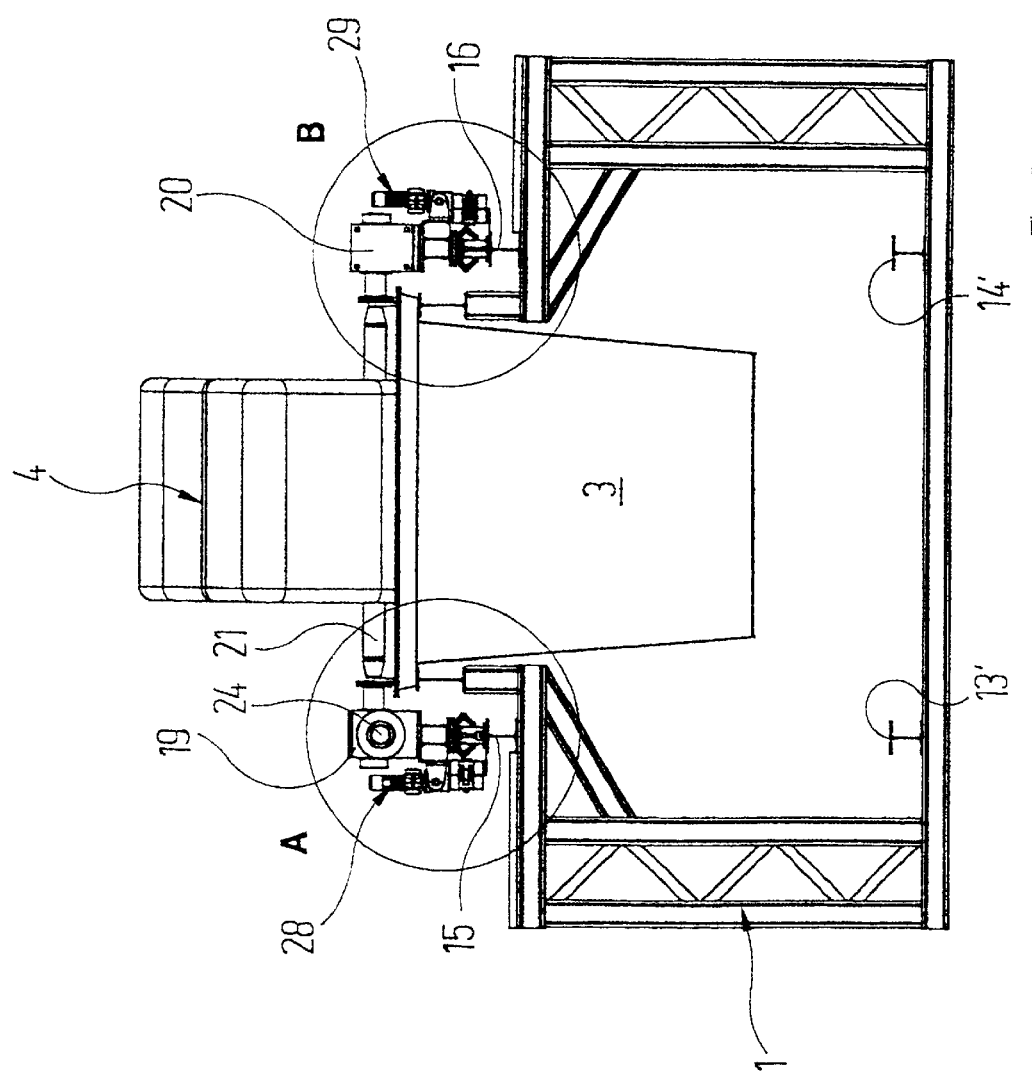
Figure 3:
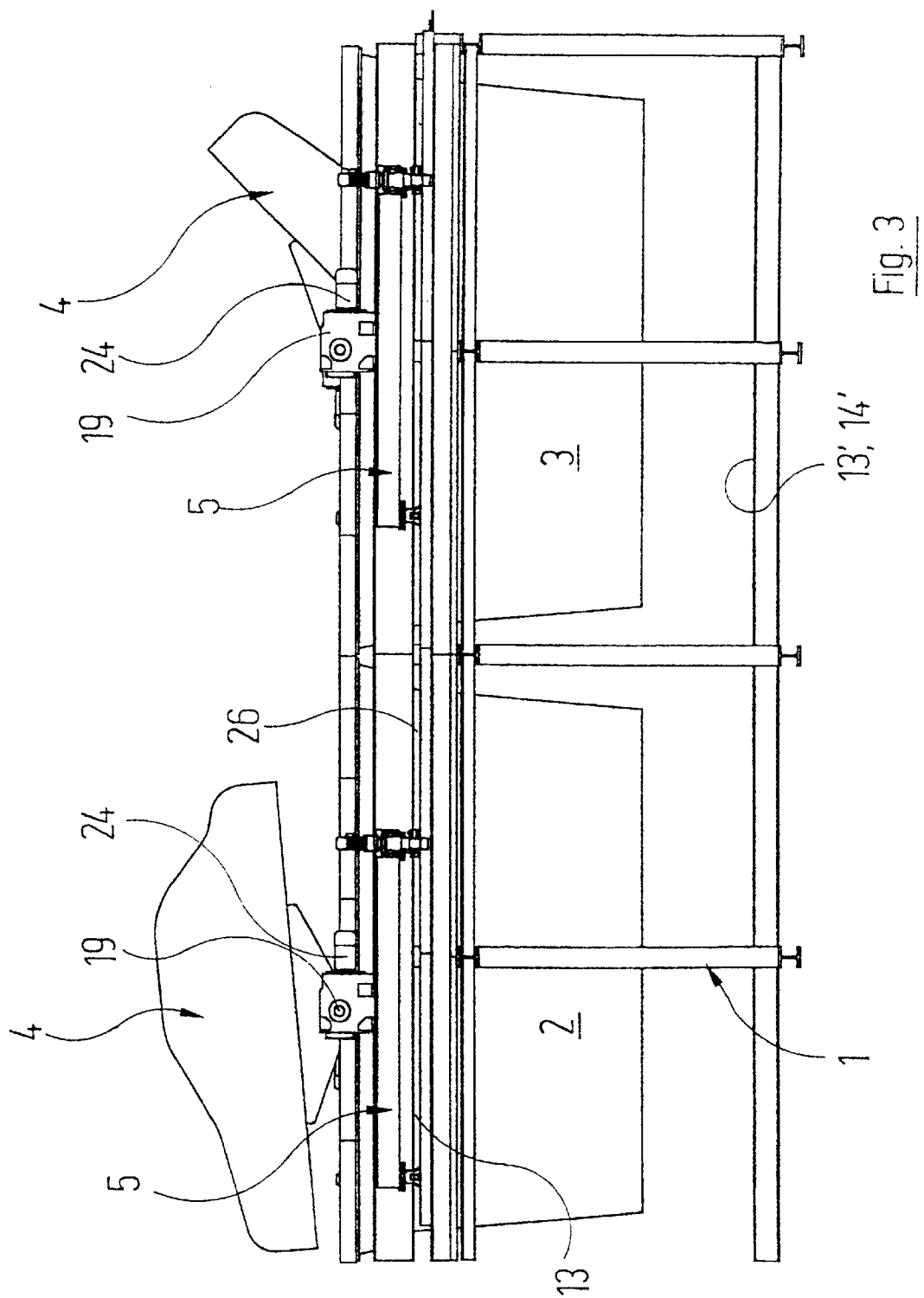
Figure 4:
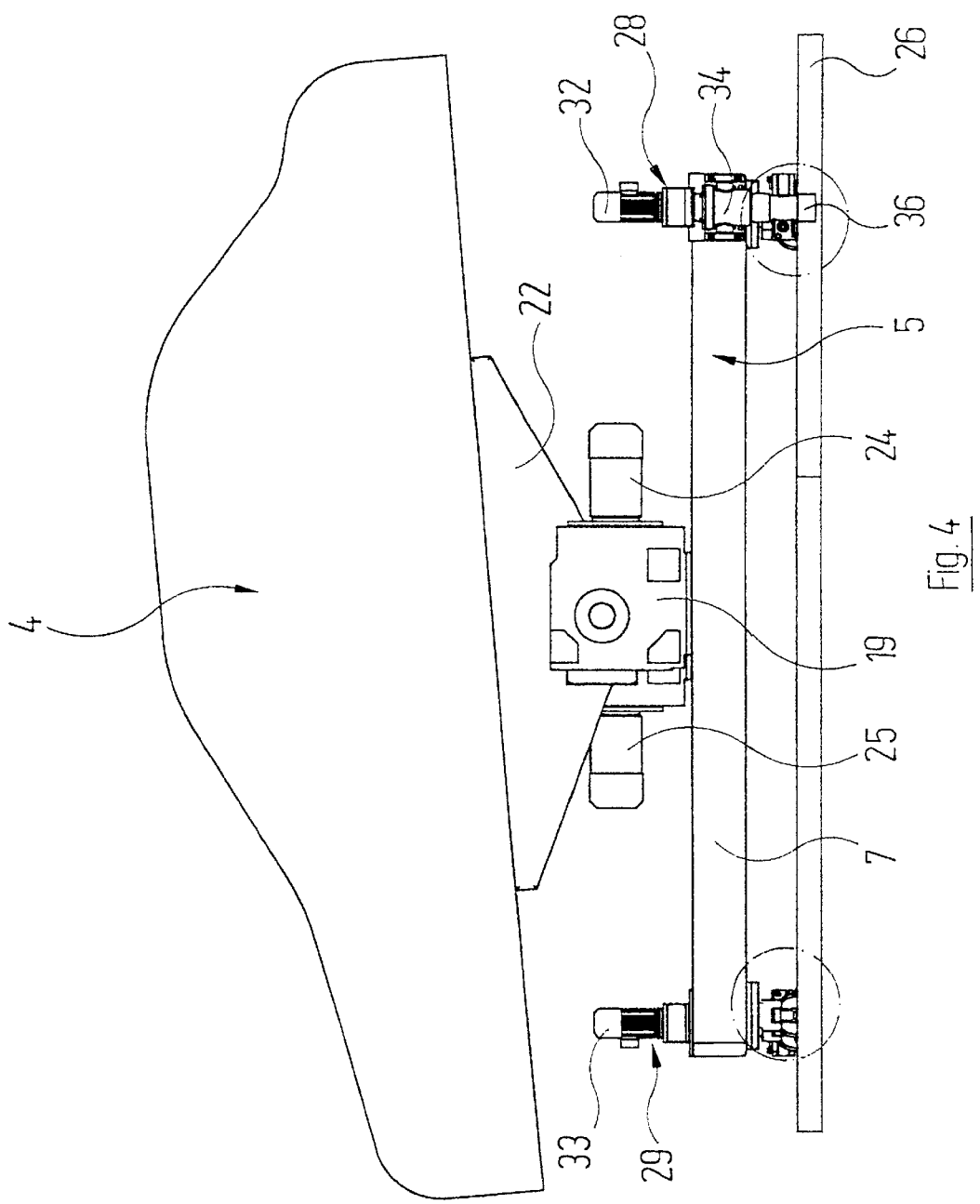
Figure 5:
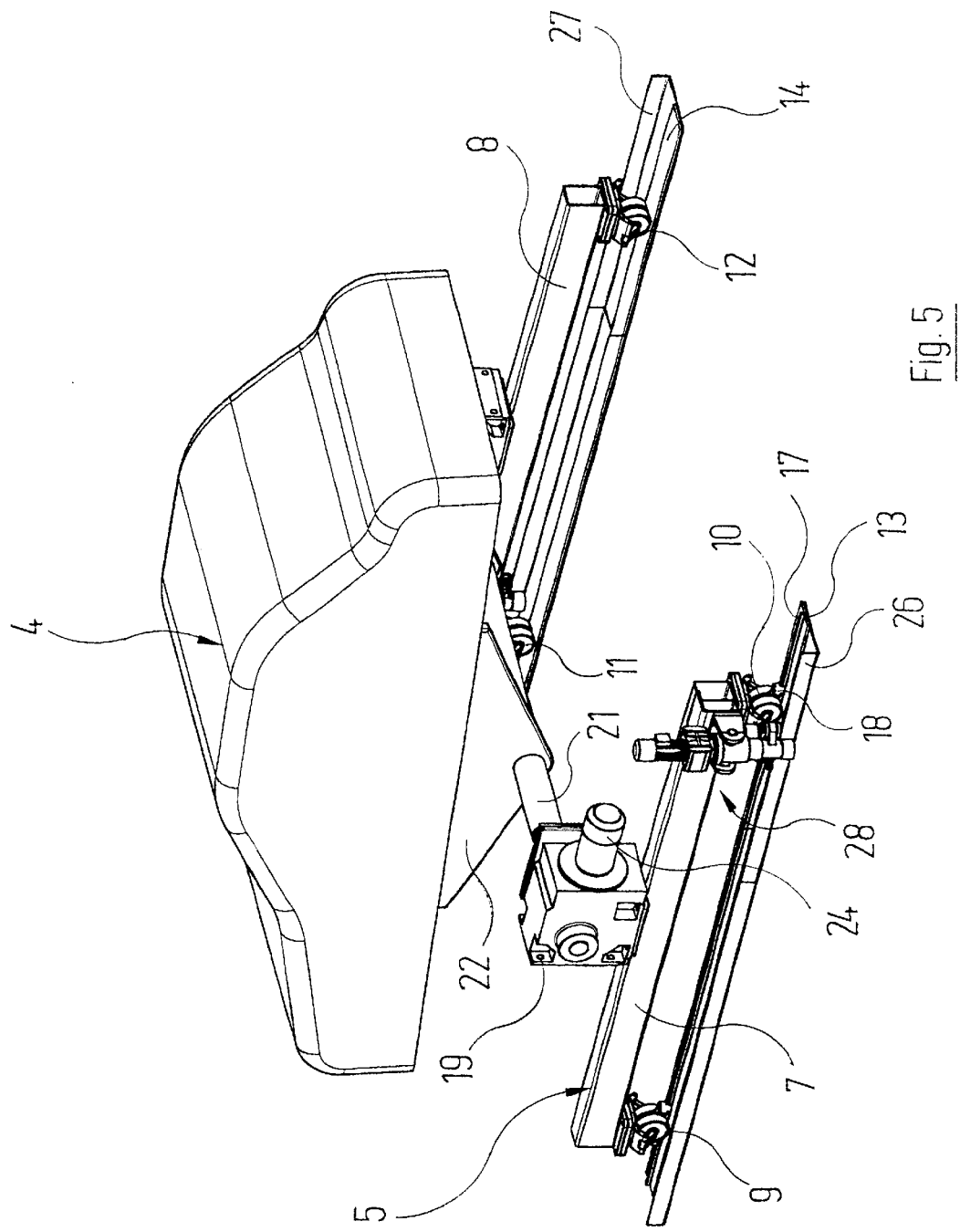
Figure 6:
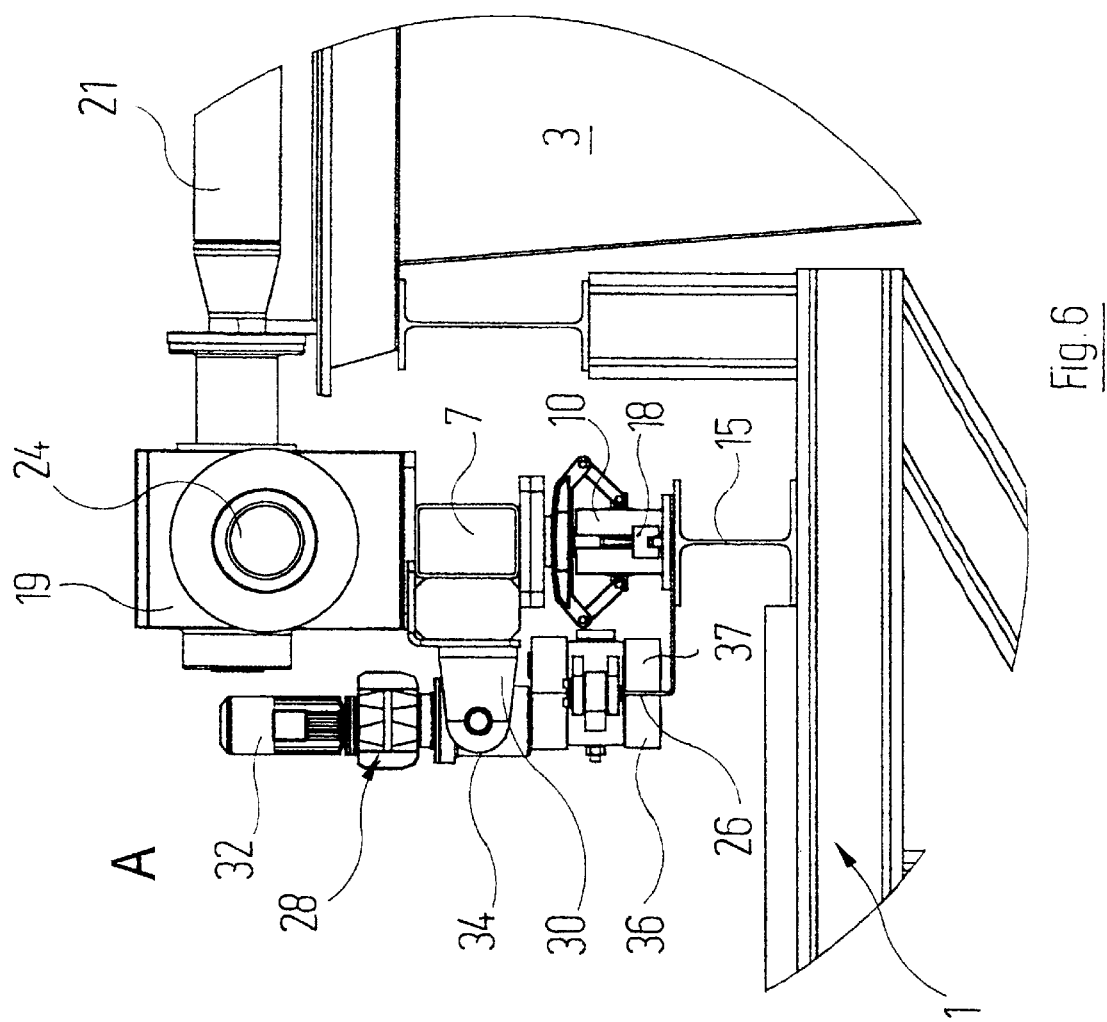

An exemplary embodiment of the invention is explained in more detail below with reference to the drawings, in which FIG. 1: shows a perspective portion of a dip-coating installation for vehicle bodies;

FIG. 2: shows a section through the installation of FIG. 1 perpendicularly to the direction of movement of the vehicle bodies, viewed form the bottom right;

FIG. 3: is a side view of the portion of the coating installation of FIG. 1;

FIG. 4: is a side view of a transport carriage used in the coating installation, having a vehicle body attached thereto;

FIG. 5: is a perspective view of the transport carriage plus vehicle body of FIG. 4;

FIG. 6: shows an enlarged detail taken from the area of the circle labelled with letter A in FIG. 2;

FIG. 7: shows an enlarged detail from the area of the circle labelled with letter B in FIG. 2.

The dip-coating installation for vehicle bodies illustrated in the drawings includes a steel structure 1 comprising a plurality of vertical posts and horizontal beams, in which steel structure 1 there are suspended two bath containers 2, 3. The bath containers 2, 3 are filled up to a given level with liquid paint, in which vehicle bodies 4 are intended to be immersed. To this end, these vehicle bodies 4 are transported with the aid of individual transport carriages 5 in the direction of the arrow 6 (c.f. FIG. 1), wherein this translational movement of the individual transport carriages 5 may proceed independently for each one and deceleration, acceleration, stops and even reversal of movement are possible in the course of these independent movements. However, all in all the vehicle bodies 4 are conveyed in the direction of the arrow 6 in FIG. 1.

The precise construction of the transport carriages 5 is shown in more detail in FIGS. 4 to 7. As shown in particular in FIG. 5, each transport carriage 5 has two longitudinal rails 7, 8, on the undersides of which there are mounted in each case two twin wheels 9, 10 and 11, 12 respectively, so as to be rotatable about horizontal axes. In addition, the wheels 9 to 12 may each rotate about a vertical axis by means of a pivoted bolster, not described in detail, such that the orientation of the twin wheels 9 to 12 may be altered relative to the respective longitudinal rails 7, 8.

The twin wheels 9, 10 roll on a first running surface 13 and the twin wheels 11, 12 on a second running surface 14 parallel thereto. The running surfaces 13, 14 are in turn mounted in each case on I-beams 15, 16, which are carried by the steel structure 1 (c.f. in particular FIG. 2.

In the middle of the first running surface 13, the lower one in FIG. 5, there is fitted a guide rib 17, which is gripped by guide members 18 comprising complementary recesses. Each guide member 18 is connected with the pivoted bolster of an associated twin wheel 9 or 10 respectively in such a way that it rotates this twin wheel 9 or 10 about the vertical axis in accordance with the course of the guide rib 17. In this way, the twin wheels 9, 10 follow the first running surface 13. The twin wheels 11, 12 associated with the second running surface 14, the upper one in FIG. 5, are designed, on the other hand, as simple follower wheels; that is to say, no separate guide means are provided for influencing the angular position of the wheels about their vertical axis of rotation. In this way, precision requirements relating to the guide means with which the transport carriages 5 are kept on the running surfaces 13, 14 may be kept low.

In the middle of each of the two longitudinal rails 7, 8 of the transport carriages 5 there is mounted a gear block 19 or 20 respectively, the driven shafts of which are connected by a rotary shaft 21. On the rotary shaft 21 there are attached, spaced from one another, two fixing plates 22, 23 triangular in form in side view. On the longest edges, normally pointing upwards, of these triangles the vehicle bodies 4 are attached in a suitable manner, not shown.

An electric motor 24 or 25 respectively is flanged onto each of the gear blocks 19, 20. The arrangement is such that, when current is supplied to the electric motors 24, 25, the rotary shaft 21 is rotated in a particular direction, wherein forces are introduced thereinto from both sides. Rotation of the rotary shaft 21 is accompanied by a corresponding rotation of the bodies 4 about the axis of the rotary shaft 21.

The twin wheels 9 to 12 of the transport carriages 5 are not themselves driven. Forwards drive of the transport carriages 5 is effected instead via a separate drive, which is explained in more detail below with reference to FIGS. 5 to 7.

Parallel to the two running surfaces 13, 14 there extend two perpendicularly oriented, stationary drive flanges 26, 27. These each interact with a pressure roll drive 28 or 29 respectively, which is attached to the side face of the adjacent longitudinal rail 7, 8 by means of a lug 30 or 31 respectively. The pressure roll drives 28, 29 each comprise an electric drive motor 32, 33 and a drive gear 34, 35. The latter drives the parallel, vertical axles of two pressure rolls 36, 37 or 38, 39, which are pressed from both sides against the respectively associated drive flange 26 or 27. If current is fed to the drive motors 32, 33, the pressure rolls 36, 37 or 38, 39 run on the respective side faces of the drive flanges 26, 27 and in so doing move the transport carriage 5 forwards on the running surfaces 13, 14.

Each transport carriage 5 comprises its own carriage control system, under the control of which it performs both its translational movement along the running surfaces 13, 14 and the rotary movement of the vehicle bodes 4 about the axis of the rotary shaft 21.

The above-described dip-coating installation operates overall as follows:

The vehicle bodies to be coated are fed to the baths 3, 4 in succession, each on their own transport carriage 5. Once the leading end of a vehicle body 4 has reached the beginning of the first bath 2 in the transport direction 6, the carriage control system decides whether this vehicle body 4 should be immersed in this bath 2. If yes, the electric motors 24, 25 are supplied with current. The electric motors are supplied with current in accordance with the speed of the translational movement, which is preset by the pressure roll drives 28, 29, and the vehicle body 4 is rotated about the axis of the rotary shaft 21 and immersed in the paint contained in the bath 2. Depending on requirements, the translational movement of the transport carriage 5 may be slowed down or stopped when the vehicle body 4 is immersed and the vehicle body 4 subjected to a swinging movement, by energising the electric motors 24, 25 alternately in opposing directions. After the desired residence time in the bath 2, the vehicle body 4 is lifted back out of the bath 2 by actuation of the electric motors 24, 25 and rotation about the axis of the rotary shaft 21.

If necessary, the vehicle body 4 may be brought into different angular positions above the bath 2 by appropriately energising the electric motors 24, 25, in order to allow the paint to run and drip as fully as possible back into the associated bath 2 and in this way to minimise paint entrainment. Then, by actuating the pressure roll drives 28, 29, the translational movement of the transport carriage 5 is resumed, optionally at a higher speed, until the vehicle body 4 has reached the second bath 3, in the direction of movement. The same processes may then be repeated as were described for the first bath 2.

In certain coating installations, different vehicle bodies 4 follow one another which have to be treated in different ways. This is straightforwardly possible with the coating installation described. For example, a bath 2, 3 may be missed out completely; the vehicle body 4 may also be immersed in the bath 2, 3 in question by a rearwardly directed, combined rotary and translational movement. "Lifting" the vehicle body 4 out of the bath 2, 3 may be performed by continuing the rotary movement in the direction of rotation in which the immersion process took place; alternatively, it is also possible to rotate the vehicle body 4 back out of the bath 2, 3 on the same side as it was previously immersed therein by reversing the direction of rotation of the rotary shaft 21.

Since, as mentioned, successive vehicle bodies 4 may be treated in the baths 2, 3 in different ways, different intervals may be set between successive transport carriages 5. These different intervals may be evened out again if desired by appropriate acceleration or deceleration of successive transport carriages 5.

At the beginning of the coating installation, there is located a loading station, not shown, at which the individual vehicle bodies 4 are positioned on a stationary transport carriage 5 and attached thereto. Likewise, at the end of the coating installation there is located a removal station, at which the vehicle bodies 4 are removed from a stationary transport carriage 5. Both the loading and the removal station take the form of lifting stations. In the removal station, the emptied transport carriage 5 is lowered until the running surfaces 13, 14, which also continue into the removal station, are aligned with parallel running surfaces 13', 14', which extend back in a lower storey of the steel structure 1 as far as the loading station. The empty transport carriages 5 are brought on these running surfaces 13', 14' under the baths 2, 3 contrary to the direction of arrow 6 to the loading station, a procedure which may be performed at a higher speed. In the loading station, the transport carriages 5 are again raised to the level of the upper running surfaces 13, 14 and, as already described, loaded with new vehicle bodies 4 to be coated.

As is clear from FIG. 1 in particular, all the conveying system components of the coating installation described are located laterally of the baths 2, 3, such that the liquids in the baths 2, 3 cannot be contaminated by these conveying system components.

What is claimed is:
1. An installation for treating, in particular coating, articles, especially vehicle bodies, having:
  a) at least one bath, in which a treatment liquid, in particular a paint, is located, in which the articles are intended to be immersed;
  b) a conveying means, with which the articles may be conveyed through the installation in a continuous or intermittent translational movement;
  c) a plurality of immersion means, which are connected with the conveying means, wherein each immersion means carries one article and are in a position to immerse the article in the at least one bath,
characterized in that;
  d) the conveying means comprises a plurality of independent transport carriages, which run in guided manner on running surfaces and each comprise a separate drive for translational movement and a drive operating independently thereof for an immersion movement.

2. An installation according to claim 1, characterized in that at least one vertically oriented transport flange extends parallel to a running surface and in that the drive for the translational movement of each transport carriage comprises a pressure roll drive, which comprises at least two pressure rolls running under pressure on opposing side faces of the transport flange, at least one of which pressure rolls is driven.

3. An installation according to claim 1, characterized in that running wheels of the transport carriages may be rotated about a vertical axis by means of a pivoted bolster.

4. An installation according to claim 3, characterized in that at least two running wheels of each transport carriage are provided with a leading guide member, which encompasses a profile of the associated running surface and is connected with the pivoted bolster of the associated running wheel.

5. An installation according to claim 1, characterized in that the immersion means is a rotary means, which immerses the articles in the treatment liquid by rotation about an approximately horizontal axis.

* * * * *